UNITED STATES PATENT OFFICE.

REUBEN DANIELS, OF WOODSTOCK, VERMONT.

MANUFACTURE OF GRANULAR FUEL FROM BRUSH-WOOD AND TWIGS.

Specification forming part of Letters Patent No. 9,015, dated June 15, 1852.

*To all whom it may concern:*

Be it known that I, REUBEN DANIELS, of Woodstock, in the county of Windsor and State of Vermont, have invented a new and useful manufacture or merchantable commodity—to wit, Granular Fuel Prepared from Brush-Wood and Twigs—of which the following is a specification.

It is a well-known fact that a large area of land as well in the vicinity of populous towns and cities as elsewhere is covered with a stunted growth of brush-wood, which is regarded as an incumbrance and without merchantable value, and a great number of acres of this land are annually cleared at a heavy expense by cutting down the brush and burning it to get it out of the way, so that the land may be cultivated. All attempts heretofore to convert brush-wood and twigs into a convenient and cheap fuel have proved abortive, because of the great expense of handling, transporting, and storing, and the difficulty and inconvenience of using so large a bulk of matter with so little substance and heating-power as brush-wood in the condition in which it has heretofore been employed as fuel. All these difficulties in the way of handling, transporting, storing, and using brush-wood and twigs as fuel are obviated by my mode of preparing or manufacturing it into a marketable commodity, which consists in reducing it by machinery into short pieces whose average length is best when made equal to their average diameter, or thereabout, thus converting the bulky crooked sticks and twigs into a compact granular mass, which can be handled like nut-coal, corn in the ear, or thrashed grain by a shovel, scoop, or scuttle, and can be transported to market in boxes, in barrels, in bags, or in bulk, as may be the cheapest or most expedient. The brush reduced into this granular form can be used in grates or summer stoves, or as a substitute for charcoal for kindling coal-fires, and may be used for any purpose for which a brisk light fire is required. Among the advantages of this fuel may be mentioned its cleanliness and the facility with which it may be kindled by the flame of a match or taper. I have prepared the brush-wood and twigs by submitting it to the action of a machine provided with knives to cut it into pieces of the proper length. This machine I have propelled in various ways; but steam or animal power are the best. Machines for the purpose should be made as strong as is consistent with portability, so as to be capable of resisting the heavy strains to which they are frequently subjected. The cost per cord of manufacturing this granular brush-fuel exceeds but little, if any, the cost of cutting and splitting timber into the proper size for firewood, and a cord of this fuel possesses as great marketable value as a cord of wood. Brush-wood such as is usually considered not only valueless but an incumbrance, for the clearing of which from the ground the owner of the soil usually pays several dollars per acre, will usually yield several cords of granular fuel. From this it follows that the crops of brush-wood growing on the immense tracts of land lying in populous districts by my discovery are rendered highly valuable. My discovery or invention of the manufacture of granular fuel, therefore, has greatly increased the value of brush-wood lands lying in populous districts where fuel is scarce, or in places having easy and cheap access to good markets for fuel. Since it takes only about one-tenth of the time to raise a crop of brush-wood that it takes to raise a crop of timber-trees, it follows that the brush crop for fuel is more immediately available than a crop of timber. Hazel-brush and other shrubbery, heretofore worthless and unused, can be converted into a valuable marketable product by being manufactured into granular fuel. In this way the quantity of available useful fuel is greatly augmented.

From the rankness and rapidity with which brush-wood and shrubbery grows the first three or four years, it often becomes in that time sufficiently matured to be manufactured with profit into granular fuel. This gives to my discovery a permanent prospective value as well as present importance, because by it the locust and other fast-growing wood can by a growth of even two or three years be made to furnish a supply of fuel sufficient for the wants of the inhabitants of the great western prairies, where the want of timber for fuel at the present time retards and almost forbids the settlement of lands in all other respects among the most desirable for the purposes of agriculture.

Machines constructed upon widely-different principles may be employed with advantage; but the construction of the machine or the manner of operating it are not material, so long as the brush and twigs are reduced by it efficiently and with due economy into a compact state in which they can be conveniently handled, transported, stored, and used.

Various machines now used for cutting straw may, when sufficiently strong, be used with advantage for cutting brush-wood into short pieces of a length equal, or thereabout, to the mean diameter of the sticks—say one inch more or less. The machine represented in the annexed drawings is very well adapted to this purpose. It the same for which Letters Patent were granted to me on the 2d day of July, in the year 1850, under the title of "Improvements in Straw-Cutters."

Figure 1 represents a top view, and Fig. 2 a longitudinal section, of the machine, in which—

A is a strong frame with a feeding-trough, D, on its top, at one end of which is a series of cutting-knives, b b b, secured to the ribs of a rotating cylinder or cutter-head, E', in such manner that the edges of the knives in revolving shall generate a cylinder whose periphery nearly touches the edge of a stationary knife, e, affixed across the mouth of the feed-trough, and whose face stands at a tangent to the cylinder described by the edges of the rotary knives.

Immediately behind the knife is a toothed feeding-roller, B, is placed, which is hung in a swing-frame, C, which turns on the axis of the cutting-cylinder as a center. The roller B is geared by means of the wheels i i i to the cylinder-shaft, in order that it may be turned at a speed proportionate to that with which the cutter revolves, so that it may feed forward to the knives the brush placed in the trough an equal distance at each revolution, by which means the brush is cut up into pieces of uniform length. The toothed feed-roller B is pulled down toward the bottom of the feed-trough by means of springs a a, which allow the roller to rise and fall to accommodate itself to the varying quantity or depth of brush passing under it, and as the brush is fed butt-end foremost the teeth of the roller engage with the crotches formed at the junction of the branches and draw them into the machine with great regularity and ease, however crooked they may be.

Now, it is obvious that the ends of the brush or twigs will be constantly pushed forward by the feed-roller beyond the edge of the stationary knife, and that they will be as regularly chopped off every time a rotating knife passes the stationary one. If the feed be slow compared with the velocity with which the knives rotate, the brush will be cut into short lengths; but if the feed be comparatively fast the brush will be cut into longer lengths. Therefore to adjust the machine to chop up the brush finely or coarsely simply requires the feed to be varied. A very good average length to cut small brush is an inch; but it should be cut into a length about equal to its average diameter of the main stems of the brush. Therefore the larger the brush the coarser it should be cut, and the smaller the brush the shorter the pieces into which it should be divided. The precise length must, however, be determined by the manufacturer to suit the circumstances of each case.

I claim—

The granular fuel produced from brush-wood and twigs by cutting the same into lengths about equal to its average diameter, as herein described, as a new manufacture.

In testimony whereof I have hereunto subscribed my name.

REUBEN DANIELS.

Witnesses:
P. H. WATSON,
E. S. RENWICK.